United States Patent [19]

Wunderlich

[11] Patent Number: 5,501,710
[45] Date of Patent: Mar. 26, 1996

[54] COPPER PHTHALOCYANINE DYESTUFFS AND THEIR USE

[75] Inventor: Klaus Wunderlich, Leverkusen, Germany

[73] Assignee: Bayer Aktiengesellschaft, Leverkusen, Germany

[21] Appl. No.: 323,213

[22] Filed: Oct. 14, 1994

[30] Foreign Application Priority Data

Oct. 21, 1993 [DE] Germany .............. 43 35 958.2

[51] Int. Cl.$^6$ .............. C09B 47/20; C09B 47/24; C09B 11/02; D06P 3/62
[52] U.S. Cl. .............. 8/402; 8/518; 8/661; 8/919; 106/20 D; 106/22 D; 540/131; 540/133; 540/135; 540/139
[58] Field of Search .............. 8/518, 402, 499, 8/661, 918, 919; 106/20 D, 410, 413, 22 D; 540/131, 133, 135, 139

[56] References Cited

U.S. PATENT DOCUMENTS

| | | | |
|---|---|---|---|
| 3,660,427 | 5/1972 | Back | 540/132 |
| 4,671,799 | 6/1987 | Degan et al. | 8/638 |

FOREIGN PATENT DOCUMENTS

| | | |
|---|---|---|
| 0211323 | 2/1987 | European Pat. Off. |
| 1083460 | 6/1960 | Germany. |
| 1946504 | 6/1970 | Germany. |

OTHER PUBLICATIONS

Derwent Abstract of JO 1–190770 Jul. 1989.
Derwent Abstracts, Week 8712, p. 30; FARB G02, 87–051226/08, J62034–970–A; "Illustration intaglio printing ink prepn . . . ", Bayer AG, Aug. 8, 1985.

*Primary Examiner*—Margaret Einsmann
*Attorney, Agent, or Firm*—Sprung Horn Kramer & Woods

[57] ABSTRACT

The novel copper phthalocyanine dyestuffs of the formula (I)

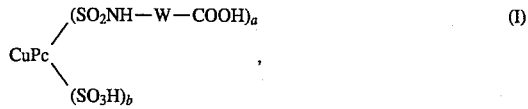

in which
CuPc represents a copper phthalocyanine radical,
W represents branched or straight-chain $C_{9-16}$-alkylene,
a represents 2 to 4,
b represents 0 to 2, and
the sum of a and b is 3 to 4,
are suitable for dyeing and printing cellulose-coating materials and for producing printing inks, in particular for ink-jet printing systems.

10 Claims, No Drawings

COPPER PHTHALOCYANINE DYESTUFFS AND THEIR USE

The present invention relates to novel copper phthalocyanine dyestuffs, liquid preparation of these dyestuffs and processes for dyeing and printing cellulose-containing material.

The invention provides copper phthalocyanine dyestuffs which, in the form of the free acid, have the general formula I

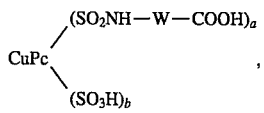

in which
CuPc represents a copper phthalocyanine radical,
W represents branched or straight-chain $C_{9-16}$-alkylene,
a represents 2 to 4,
b represents 0 to 2, and
the sum of a and b is 3 to 4.

Preference is given to dyestuffs of the formula (I), in which
W represents branched or straight-chain $C_{10-12}$-alkylene,
a represents 3 to 4,
b represents 0 to 1, and
the sum of a and b is 3 to 4.

The copper phthalocyanine dyestuffs (I) according to the invention can be prepared in the usual manner known per se by condensing copper chlorosulphonylphthalocyanines or copper chlorosulphonylphthalocyaninesulphonic acids with 2 to 4 mol of an aminoalkanecarboxylic acid of the general formula (II)

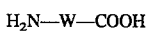

in which
W has the above-mentioned general and preferred meaning, followed, if desired, by hydrolysis of excess chlorosulphonyl groups. The dyestuff according to the invention can be isolated from the resulting crude dyestuff solution or suspension by customary methods, such as, for example, salting out and filtration. However, in most cases, the liquid dyestuff preparation according to the invention can be obtained without having to isolate the dyestuff in-between.

Examples of aminoalkanecarboxylic acids of the general formula (II) are 10-aminodecanoic acid, 11-aminoundecanoic acid, 3-aminoundecanoic acid, 2-aminododecanoic acid (2-aminolauric acid), 12-aminododecanoic acid (12-aminolauric acid) or 16-aminohexadecanoic acid.

The invention also provides liquid preparation containing at least one dyestuff of the formula (I) according to the invention.

The dyestuff preparation according to the invention are preferably aqueous solutions containing 0.1 to 20% by weight of dyestuff of the formula (I) and having a pH of 7 to 13.

The dyestuff preparation according to the invention are distinguished by a long shelf life of, for example, 6 weeks at −2° C. or +40° C.

The dyestuff preparation according to the invention can be prepared by dissolving at least one dyestuff of the formula (I) in water, if necessary with the addition of inorganic and/or organic bases. Alternatively, the synthesis solution or suspension formed during synthesis of the dyestuff can be converted into the dyestuff preparation according to the invention without isolating the dyestuff in-between, if necessary with the addition of inorganic and/or organic bases and, if necessary, water. In most cases, this can be done in the complete absence of solubility-improving organic additives.

In some cases, it may be valuable first to purify and desalt the synthesis solution or suspension by applying membrane processes, such as, for example, ultrafiltration, microfiltration and reverse osmosis or a combination thereof and then to convert it, if necessary by addition of bases and/or water, into the dyestuff preparation according to the invention.

Examples of inorganic and organic bases include:
Hydroxides, carbonates and hydrogen carbonates of lithium, sodium, potassium, ammonium, such as, for example, lithium hydroxide, sodium hydroxide, potassium hydroxide, lithium carbonate, sodium carbonate, potassium carbonate; organic amines, such as monoethanol-, diethanol-, triethanol-, 3-propanol-, 2-propanol-, dipropanol-, diisopropanol-, tripropanol-, triisopropanol-, diethyl-, triethyl-, N-methylethanol-, N-methyldiethanol, N-ethyldiethanol-, N,N-dimethylethanol-, N,N-diethylethanol-, N-phenylethanolamine, 1-amino-2-propanol, 2-amino-1-propanol, N-2-hydroxyethyldiisopropanolamine, tris-N,N, N-[2-(2'-hydroxyethoxy)ethyl] amine or heterocyclic amines, such as, for example, morpholine or hydroxyethylmorpholine, and furthermore sodium methoxide, lithium ethoxide or potassium tert.-butoxide.

The bases used for adjusting the pH of the dyestuff preparation according to the invention are preferably alkali metal hydroxides which may already be present as a result of synthesis.

The dyestuffs or dyestuff preparation according to the invention produce dyeings having good wet and light fastness properties on cellulose-containing materials, in particular paper, cotton and viscose. Accordingly, the invention also provides processes for dyeing and printing cellulose-containing material with the dyestuffs or dyestuff preparation according to the invention.

The dyestuffs can be used in all dyeing methods customary for direct dyestuffs in the paper and textile industries, in particular in mass and surface colouration of paper for sized and unsized grades, starting from bleached or unbleached wood pulp of different provenience, such as softwood, sulphite and/or sulphate pulp or hard wood sulphite and/or sulphate pulp. They can also be employed in the yarn and piece-dyeing of cotton, viscose and linen by the exhaust method from a long liquor or in the continuous method.

The compounds of the formula (I) can also be used for dyeing in the form of the dyestuff preparations according to the invention. This application form is preferred in particular in the dyeing of paper.

Furthermore, the invention provides printing inks containing at least one dyestuff of the formula (I) and processes for preparing the printing inks.

Preferably, the printing inks according to the invention contain 0.1 to 20% by weight, in particular 0.5 to 15% by weight, and very particularly preferably 0.5 to 5% by weight, of the dyestuff of the formula (I), preferably in the form of the alkali metal salt or ammonium salt, dissolved in water and/or one or more organic solvents. The pH of the printing inks according to the invention can be between pH 5 and 13. Preferably, the printing inks have a pH of 7 to 13.

The printing inks according to the invention can contain customary additives, such as, for example, surfactants, fungicides or bactericides in the amounts customary for these additives.

The printing inks according to the invention can contain up to 50% by weight of organic solvent. Preferably, they contain 0 to 30% by weight, particularly preferably 2 to 30% by weight.

Suitable organic solvents are in particular water-soluble organic solvents, such as, for example, alcohols, in particular $C_1$–$C_4$-alkanols, such as methanol, ethanol, n-propanol, isopronanol, n-butanol, sec.-butanol, tert.-butanol, isobutanol; pentanediols; carboxamides, such as, for example, formamides and dimethylacetamide; ketones or ketone alcohols, such as acetone and diacetone alcohols, cyclic esters, such as tetrahydrofuran and dioxane; nitrogen-containing heterocycles, such as 2-pyrrolidone, N-methyl-2-pyrrolidone and 1,3-dimethyl-2-imidazolidone; polyalkylene glycols, such as polyethylene glycol and polypropylene glycol; alkylene glycol and thioglycols containing $C_2C_6$-alkylene units, such as ethylene glycol, propylene glycol, butylene glycol, triethylene glycol, thiodiglycol, hexylene glycol and diethylene glycol; other polyols, such as glycerol and 1,2,6-hexanetriol; alkyl ethers and polyalkyl ethers of alcohols such as 2-methoxyethanol, 2-(2-methoxy-ethoxy) ethanol, 2-(2-ethoxyethoxy) ethanol, 2-methoxy-2-ethoxy-2-ethoxyethanol, 2-[2-(2-methoxyethoxy)ethoxy] ethanol, and 2-[2-(2-ethoxyethoxy)ethoxy] ethanol, and sulfoxides and sulfones, in particular those having molecular weights of <200.

The printing inks according to the invention can contain, apart from the dyestuffs of the formula (I), also one or more dyestuffs customary for printing inks, which may serve, for example, for shading.

Examples of particularly suitable solvents are: ethylene glycol, diethylene glycol, triethylene glycol, 1,5-pentanediol, 2-hydroxyethyl acetate, 1-hydroxyethyl acetate, glycerol, 1,2-dihydroxypropane, 1-methoxy-2-propanol, 2-methoxy-1-propanol, N,N-dimethylformamide, pyrrolidone, N-methylpyrrolidone, ε-caprolactam, N-methyl-ε-caprolactam, tetramethylurea, 1,3-dimethyl-2-imidazolidinone, N,N'-dimethylpropyleneurea, dimethyl sulfoxide, dimethyl sulfone, sulfolane, ethylene glycol, diethylene glycol, triethylene glycol, 1,2-dihydroxypropane, 1-ethoxy-2-hydroxy-propane, polyethylene glycols having molecular weights of up to 500, heterocyclic ketones, such as 2-pyrrolidone, N-methyl-2-pyrrolidone and 1,3-dimethyl-2-imidazolidone.

The printing inks according to this invention can be prepared by dissolving the salts of the dyestuffs (I) according to this invention in water and/or one or more of the above-mentioned organic solvents, if appropriate, at elevated temperature and, if appropriate, with the addition of the inorganic and/or organic bases mentioned. If desired, in addition customary ionic or non-ionic additives can be used, for example those enabling the viscosity to be lowered and/or the surface tension to be increased.

Instead of the salts of (I), it is also possible to use the corresponding free acids in combination with at least equimolar amounts of the corresponding bases.

The dyestuff of the formula (I) used for preparing the printing inks according to the invention can first be purified, desalted and, if desired, concentrated by applying membrane processes, such as, for example, ultrafiltration, microfiltration, reverse osmosis or a combination thereof. The solutions or suspensions formed in the membrane processes mentioned can be used directly for preparing the printing inks according to the invention. However, it is also possible to convert the solutions or suspensions beforehand into solid formulations, for example by spray-drying.

It is also possible to convert the synthesis solution or suspension formed in the synthesis of the dyestuff according to the invention without isolating the dyestuff in-between or the dyestuff preparation according to this invention, if appropriate with addition of inorganic and/or organic bases or inorganic and/or organic solvents and water, into the printing inks according to the invention.

The synthesis solution or suspension can, if desired, first be purified and desalted by applying membrane processes such as, for example, ultrafiltration, microfiltration and reverse osmosis or a combination thereof.

The invention also provides a process for printing substrates using an ink-jet recording system, a printing ink according to the invention being used as the recording fluid.

The printing inks according to the invention are suitable for printing a wide range of substrates, such as, for example, paper, wood, textiles, plastics or metal.

Preferably, the printing inks according to the invention are used as recording fluids for ink-jet recording systems. Examples of ink-jet recording systems are ink-jet printers, such as thermal jet, bubble jet, piezo ink-jet or valve ink-jet. The preferred recording material for ink-jet printers is paper.

The ink-jet recording method is known per se. In this method, droplets of a writing fluid are expelled from one or more small nozzles and targeted in a specific manner at a support. Electronic modulation combines the individual droplets to give characters or graphic patterns. This requires that the ink interacts with the support, preferably paper. The ink should enter the paper without spreading too much or the printing quality will be adversely affected. The printed information must dry rapidly and be waterproof and rub-fast. Many inks possess some of the required properties at the cost of the other properties. Specifically, the waterproofness of the dyestuffs is in most cases unsatisfactory.

The recording fluids according to the invention have the following advantages. The physical properties, such as viscosity, surface tension and the like, are in the suitable ranges; the recording fluids do not block the time exit orifices of the ink-jet recording devices; they produce images of high density; storage does not lead to a change in physical properties and deposition of solid components in the recording fluid; the recording fluids are suitable for recording on a wide range of recording media without any limitations with respect to the type of recording media; finally, the recording fluids are rapidly fixed and produce images having excellent waterproofness, light fastness, wear resistance and resolution.

JP-A 01,190,770 has already disclosed recording fluids for ink-jet printing which contain copper phthalocyanine dyestuffs of similar structure having carboxy-$C_{0-6}$-alkyl-sulphamoyl groups. The prints obtainable with these inks in ink-jet printing are not satisfactory with respect to the water fastness properties. It was therefore surprising that the recording fluids prepared using dyestuffs I resulted in prints having excellent wet fastness properties.

The examples which follow serve to illustrate the invention without, however, limiting it.

Parts and percentages are each by weight, unless stated otherwise.

EXAMPLE 1

120.0 parts of 96% pure (=115.2 parts of 100% pure) copper phthalocyanine are introduced into 624.7 parts of chlorosulfonic acid over a period of 1 hour with stirring, and the resulting mixture is heated to 138° C. over a period of 1.5 hours. After 8 hours of stirring at 138° C., the mixture is allowed to cool to 85° C., and 157.3 parts of thionyl chloride are added dropwise at 85° C. to 88° C. over a period of two hours. The mixture is then heated to 90° C. to 92° C. and stirred at this temperature for 4 hours. After cooling to 20° C. to 30° C., the reaction mixture is poured onto a mixture of 1000 parts of ice and 1000 parts of water. The temperature is maintained at −2° C. to 0° C. by continuous addition of 1500 parts of ice. The product is filtered off with suction and washed with 4000 parts of ice water (3000 parts of water and 1000 parts of ice).

The moist filter cake is stirred into 750 parts of water and 500 parts of ice and the pH is immediately adjusted to 8.0 by addition of 15% strength sodium hydroxide solution. A further 200 parts of ice are added, and 161 parts of 11-aminoundecanoic acid are then introduced. The pH is brought to 10.5 by dropwise addition of 15% strength sodium hydroxide solution and maintained at this value during the reaction. The temperature is allowed to rise from 0° C. to 20° C. over a period of 4 hours. After 2 hours of stirring at 20° C. to 25° C., the mixture is heated to 60° C. over a period of one hour, and the pH is allowed to drop to 9.0. After 1 hour at 60° C. and at pH 9.0 it is cooled to 20° C. to 25° C.. 10 parts of a commercially available kieselguhr-based clarifying agent (e.g. Dicalite®) are added to the solution. After 0.5 hour, the mixture is filtered, and the clarification residue is washed with 200 parts of water. 475 parts of water are added to the filtrate to give 3400 parts of a liquid preparation according to the invention containing the dyestuff according to the invention which, in the form of its free acid, has the formula $$CuPc[SO_2NH-(CH_2)_{10}COOH]_4$$

as a stable approximately 9.5% strength solution ($\lambda_{max}$: 622; 664 in $H_2O$ at pH 9.0).

EXAMPLE 2

A mixture of 50% of bleached pinewood sulphate pulp and 50% of bleached beechwood sulphate pulp is ground at a consistency of 2.5% to a degree of fineness of 36° SR.

In a beaker, 20 ml of a 0.75% strength aqueous solution of the liquid preparation according to the invention from Example 1 (3% relative to wood pulp) are added to 200 g of this suspension, containing 5 g of wood pulp, and the resulting mixture is stirred for 5 minutes. This is followed by addition of 10 ml of a 1% strength resin size solution and, after another minute, 15 ml of a 1% strength aluminium sulphate solution, and the resulting mixture is diluted with 800 ml of water and stirred for another 3 minutes.

This wood pulp suspension is used to form a sheet of paper on a manual sheet form, the resulting sheet is pressed in a manual press and dried on a cylinder dryer at 100° C. for 10 minutes while turning it over twice.

The paper colouration thus obtained exhibits a brilliant turquoise blue in high colour depth and possesses excellent bleeding and light fastness.

EXAMPLE 3

15 parts of the liquid preparation obtained according to Example 1 (dyestuff content about 10%) are diluted with a mixture of 76 parts of water and 9 parts of diethylene glycol. The recording fluid thus obtained when used in a Hewlett Packard DeskJet printer (Deskjet is a registered trade mark of the Hewlett Packard Company, USA) produces prints in highly light- and wet-fast cyan shades on conventional writing paper.

EXAMPLE 4

The method of Example 1 is followed, replacing the 161 parts of 11-aminoundecanoic acid in Example 1, 2nd paragraph, by the same amount of 3-aminoundecanoic acid, to give a liquid preparation containing the dyestuff according to the invention which, in the form of its free acid, has the formula $$CuPc[SO_2NH-CHCH_2COOH]_4$$
$$\ \ \ \ \ \ \ \ \ \ \ \ \ \ \ \ \ \ \ \ \ \ \ |$$
$$\ \ \ \ \ \ \ \ \ \ \ \ \ \ \ \ \ \ (CH_2)_7CH_3$$

as a stable approximately 9% strength solution. This dyestuff also produces dyeings and prints in comparable shades have good fasteness properties by the method of Examples 2 or 3.

A dyestuff having similar properties is obtained by replacing the 161 parts of aminoundecanoic acid in Example 1 by 170 parts of 12-aminolauric acid (12-aminododecanoic acid). In the form of its free acid, it has the formula $$CuPc[SO_2NH-(CH_2)_{11}COOH]_4$$

$\lambda_{max}$: 623; 664 in $H_2O$ at pH 9.0).

This dyestuff also produces dyeings and prints in comparable shades having good fastness properties by the method of Examples 2 or 3.

EXAMPLE 5

120.0 parts of 96% pure (=115.2 parts of 100% pure) copper phthalocyanine are introduced into 624.7 parts of chlorosulfonic acid over a period of 1 hour with stirring, and the resulting mixture is heated to 119° C. over a period of 0.5 hour. After 4 hours of stirring at 119° C., the mixture is allowed to cool to 85° C., and 137.6 parts of thionyl chloride are added dropwise at 85° C. to 88° C. over a period of two hours. The mixture is then heated to 90° C. to 92° C. and stirred at this temperature for 4 hours. After cooling to 20° C. to 30° C., the reaction mixture is poured onto a mixture of 1000 parts of ice and 1000 parts of water. The temperature is maintained at −2° C. to 0° C. by continuous addition of 1500 parts of ice. The product is filtered off with suction and washed with 4000 parts of ice water (3000 parts of water and 1000 parts of ice).

The moist filter cake is stirred into 750 parts of water and 500 parts of ice and the pH is immediately adjusted to 8.0 by addition of 15% strength sodium hydroxide solution. A further 200 parts of ice are added, and 141 parts of 11-aminoundecanoic acid are then introduced. The pH is brought to 10.5 by dropwise addition of 15% strength sodium hydroxide solution and maintained at this value during the reaction. The temperature is allowed to rise from 0° C. to 20° C. over a period of 4 hours. After 2 hours of stirring at 20° C. to 25° C., the mixture is heated to 60° C. over a period of one hour, and the pH is allowed to drop to 9.0. After 1 hour at 60° C. and at pH 9.0 it is cooled to 20° C. to 25° C. 10 parts of a commercially available kieselguhr-based clarifying agent (e.g. Dicalite®) are added to the solution. After 0.5 hour, the mixture is filtered, and the clarification residue is washed with 200 parts of water. 450 parts of water are added to the filtrate to give 3400 parts of a liquid preparation according to the invention containing the dyestuff according to the invention which, in the form of its free acid, has the formula $$CuPc[SO_2NH-(CH_2)_{10}COOH]_{3.3}$$

as a stable approximately 10% strength solution ($\lambda_{max}$: 616; 661 in $H_2O$ at pH 9.0). This dyestuff also produces dyeings and prints in comparable shades have good fastness properties by the methods of Examples 2 or 3.

EXAMPLE 7

120.0 parts of 96% pure (=115.2 parts of 100% pure) copper phthalocyanine are introduced into 624.7 parts of chlorosulfonic acid over a period of 1 hour with stirring, and the resulting mixture is heated to 138° C. over a period of 1.5 hours. After 8 hours of stirring at 138° C., the mixture is allowed to cool to 20° C. The reaction mixture is then poured onto a mixture of 1000 parts of ice and 1000 parts of water. The temperature is maintained at −2° C. to 0° C. by continuous addition of 1500 parts of ice. The product is filtered off with suction and washed with 4000 parts of ice water (3000 parts of water and 1000 parts of ice) to which 150 ml of 2 N hydrochloric acid had been added.

The moist filter cake is stirred into 750 parts of water and 500 parts of ice and the pH is immediately adjusted to 7.0 by addition of 15% strength sodium hydroxide solution. 101 parts of 11-aminoundecanoic acid are then introduced. The pH is brought to 10.5 by dropwise addition of 15% strength sodium hydroxide solution and maintained at this value during the reaction. The temperature is allowed to rise from 0° C. to 20° C. over a period of 4 hours. After 2 hours of stirring at 20° C. to 25° C., the mixture is heated to 60° C. over a period of one hour, and the pH is allowed to drop to 9.0. After 1 hour at 60° C. and at pH 9.0 it is cooled to 20° C. to 25° C. 10 parts of a commercially available kieselguhr-based clarifying agent (e.g. Dicalite®) are added to the solution. After 0.5 hour, the mixture is filtered, and the clarification residue is washed with 200 parts of water. This gives 2450 parts of a liquid preparation according to the invention containing the dyestuff according to the invention which, in the form of its free acid, has the formula

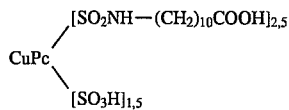

as a stable approximately 11% strength solution. This dyestuff also produces dyeings and prints in comparable shades having good fastness properties by the methods of Examples 2 or 3.

EXAMPLE 8

Example 1 is repeated under the same conditions, except that the 161 parts of 11-aminoundecanoic acid in Example 1, 2nd paragraph, are replaced by 80.5 parts of the same compound, to give 3150 parts of a liquid preparation according to the invention containing the dyestuff according to the invention which, in the form of its free acid, has the formula

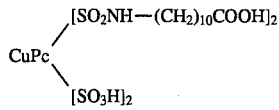

as a stable approximately 8% strength solution and likewise producing dyeings and prints in comparable shades have good fastness properties by the methods of Examples 2 or 3.

EXAMPLE 9

3400 parts of the liquid preparation obtained according to Example 1 (NaCl- content about 1.4%) are diafiltered in a laboratory ultrafiltration unit using a total of 9000 parts of water and reconcentrated to about 3800 parts. The resulting liquid finish contains about 8.5% of the dyestuff according to Example 1 but no more than 0.05% of sodium chloride.

The nearly NaCl-free liquid preparation thus obtained likewise produces brilliant cyan-coloured prints having excellent light and water fastness properties in INKJET printing.

I claim:

1. Copper phthalocyanine dyestuffs which, in the form of the free acid, have the formula

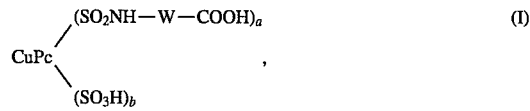

in which
CuPc represents a copper phthalocyanine radical,
W represents branched or straight-chain $C_{9-16}$-alkylene,
a represents 2 to 4,
b represents 0 to 2, and
the sum of a and b is 3 to 4.

2. Copper phthalocyanine dyestuffs according to claim 1, in which
W represents branched or straight-chain $C_{10-12}$-alkylene,
represents 3 to 4,
represents 0 to 1.

3. An aqueous dyestuff preparation, which contains 0.1–20% by weight of one or more copper phthalocyanine dyestuffs of the formula (I) according to claim 1 and exhibits a pH of 7 to 13.

4. A process for dyeing and printing cellulose-containing material, wherein at least one dyestuff according to claims 1 or 2 is used.

5. A process for dyeing cellulose-containing material, wherein a dyestuff preparation according to claim 3 is used.

6. Process according to claim 4, wherein the cellulose-containing material is paper or wood pulp.

7. Printing ink containing at least one dyestuff according to claim 1.

8. Printing ink according to claim 7 containing 0.1 to 20% by weight of dyestuff, dissolved in at least one solvent selected from the group consisting of water and an organic solvent and having a pH of between 7 and 13.

9. Process for printing substrates with a recording fluid using an ink-jet recording system, wherein the recording fluid is a printing ink according to claim 7.

10. Process according to claim 9, wherein the substrate is paper, wood, textiles, plastic or metal.

* * * * *

UNITED STATES PATENT AND TRADEMARK OFFICE
CERTIFICATE OF CORRECTION

PATENT NO. : 5,501,710
DATED      : March 26, 1996
INVENTOR(S): Wunderlich, Klaus It is certified that error appears in the above-indentified patent and that said Letters Patent is hereby corrected as shown below:

Col. 8, line 30        Before " represents " insert -- a --

Col. 8, line 31        Before " represents " insert -- b --

Col. 8, lines 37-38    Delete " claims 1 or 2 " and substitute -- claim 1 --

Signed and Sealed this

Twenty-seventh Day of August, 1996

Attest:

BRUCE LEHMAN

Attesting Officer        Commissioner of Patents and Trademarks